United States Patent
Wilson et al.

(10) Patent No.: US 10,452,581 B2
(45) Date of Patent: *Oct. 22, 2019

(54) MEMORY DESCRIPTOR LIST CACHING AND PIPELINE PROCESSING

(71) Applicant: Microsoft Technology Licensing, LLC, Redmond, WA (US)

(72) Inventors: Mei L. Wilson, Redmond, WA (US); Jitesh Krishnan, Kirkland, WA (US); Sathyanarayanan Karivaradaswamy, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/793,857

(22) Filed: Oct. 25, 2017

(65) Prior Publication Data

US 2018/0173656 A1 Jun. 21, 2018

Related U.S. Application Data

(63) Continuation of application No. 14/626,681, filed on Feb. 19, 2015, now Pat. No. 9,817,776.

(Continued)

(51) Int. Cl.
*G06F 13/28* (2006.01)

(52) U.S. Cl.
CPC ........ *G06F 13/28* (2013.01); *G06F 2212/306* (2013.01); *G06F 2212/455* (2013.01); *G06F 2212/464* (2013.01)

(58) Field of Classification Search
CPC .............. G06F 13/28; G06F 2212/306; G06F 2212/455; G06F 2212/464
See application file for complete search history.

(56) References Cited

U.S. PATENT DOCUMENTS

| 5,828,903 A | 10/1998 | Sethuram et al. |
| 6,145,016 A | 11/2000 | Lai et al. |

(Continued)

FOREIGN PATENT DOCUMENTS

| CN | 1497448 A | 5/2004 |
| CN | 1307570 C | 3/2007 |

(Continued)

OTHER PUBLICATIONS

"AVStream Pipes and Circuits", Retrieved from <<https://docs.microsoft.com/en-us/windows-hardware/drivers/stream/avstream-pipes-and-circuits>>, Apr. 20, 2017, 2 Pages.

(Continued)

*Primary Examiner* — Ryan Bertram
(74) *Attorney, Agent, or Firm* — Davin Chin; Chin IP, PLLC

(57) ABSTRACT

Memory descriptor list caching and pipeline processing techniques are described. In one or more examples, a method is configured to increase efficiency of buffer usage within a pipeline of a computing device. The method includes creation of a buffer in memory of the computing device and caching of a memory descriptor list by the computing device that describes the buffer in a buffer information cache and has associated therewith a handle that acts as a lookup to the memory descriptor list. The method also includes passing the handle through the pipeline of the computing device for processing of data within the buffer by one or more stages of the pipeline such that access to the data is obtained by the one or more stages by using the handle as the lookup as part of a call to obtain the memory descriptor list for the buffer from the buffer information cache.

20 Claims, 7 Drawing Sheets

Related U.S. Application Data

(60) Provisional application No. 62/105,129, filed on Jan. 19, 2015.

(56) References Cited

U.S. PATENT DOCUMENTS

| | | | |
|---|---|---|---|
| 6,212,574 | B1 | 4/2001 | O'Rourke et al. |
| 6,389,427 | B1 | 5/2002 | Faulkner |
| 6,975,752 | B2 | 12/2005 | Dixon et al. |
| 7,111,297 | B1 | 9/2006 | Sankaranarayan et al. |
| 7,444,637 | B2 | 10/2008 | Pronovost et al. |
| 7,444,647 | B2 | 10/2008 | Parry |
| 7,603,484 | B2 | 10/2009 | Dai et al. |
| 7,647,496 | B2 | 1/2010 | Callender et al. |
| 8,185,783 | B2 | 5/2012 | Lee et al. |
| 8,463,980 | B2 | 6/2013 | Post et al. |
| 8,606,950 | B2 | 12/2013 | Glatron et al. |
| 2002/0152331 | A1 | 10/2002 | Wong et al. |
| 2004/0057380 | A1 | 3/2004 | Biran et al. |
| 2004/0075664 | A1 | 4/2004 | Law et al. |
| 2004/0160446 | A1* | 8/2004 | Gosalia ............. G06F 9/4843 345/503 |
| 2004/0223003 | A1 | 11/2004 | Heirich et al. |
| 2005/0033874 | A1 | 2/2005 | Futral et al. |
| 2006/0106853 | A1 | 5/2006 | Makhervaks et al. |
| 2006/0253859 | A1 | 11/2006 | Dai et al. |
| 2007/0011687 | A1 | 1/2007 | Ilik et al. |
| 2007/0136730 | A1 | 6/2007 | Wilt et al. |
| 2008/0095446 | A1 | 4/2008 | Chen et al. |
| 2008/0124041 | A1 | 5/2008 | Nielsen et al. |
| 2008/0301687 | A1 | 12/2008 | Gosalia et al. |
| 2009/0204978 | A1 | 8/2009 | Lee et al. |
| 2009/0287858 | A1* | 11/2009 | Kawahara ............. G06F 13/28 710/22 |
| 2009/0310023 | A1 | 12/2009 | Nakayama |
| 2009/0323818 | A1 | 12/2009 | Weiss et al. |
| 2010/0306405 | A1 | 12/2010 | Galles |
| 2012/0120965 | A1 | 5/2012 | Khawer et al. |
| 2012/0131253 | A1* | 5/2012 | McKnight ............. G06F 1/30 710/308 |
| 2012/0147021 | A1 | 6/2012 | Cheng et al. |
| 2013/0321677 | A1 | 12/2013 | Cote et al. |
| 2014/0007139 | A1 | 1/2014 | Janssen et al. |
| 2014/0075117 | A1 | 3/2014 | Tripathi et al. |
| 2014/0195834 | A1 | 7/2014 | Weinsberg et al. |
| 2015/0309943 | A1* | 10/2015 | Kim .................. G06F 12/1081 710/308 |

FOREIGN PATENT DOCUMENTS

| | | |
|---|---|---|
| CN | 101175218 A | 5/2008 |
| CN | 102103552 A | 6/2011 |
| CN | 102364431 A | 2/2012 |

OTHER PUBLICATIONS

"Converting Win32 Kernel-mode Print Drivers to User Mode", Retrieved from <<http://unixwiz.net/techtips/win32-pdriver-ktou.html>>, Jul. 29, 2006, 14 Pages.

"Get Canon DPP and EOS Utility Without a Disc", Retrieved from <<http://www.dslrfilmnoob.com/2013/08/30/canon-dpp-eos-utility-disk/>>, Aug. 30, 2013, 4 Pages.

"Introduction to the WDF User-Mode Driver Framework by Microsoft", In Proceedings of WinHEC, May 16, 2006, 12 Pages.

"User Mode and Kernel Mode", Retrieved from <<https://docs.microsoft.com/en-us/windows-hardware/drivers/gettingstarted/user-mode-and-kernel-mode>>, Oct. 31, 2013, 2 Pages.

"VRAM Capture Properties", Retrieved from <<https://docs.microsoft.com/en-us/windows-hardware/drivers/stream/vram-capture-properties>>, Apr. 28, 2013, 2 Pages.

"Final Office Action Issued in U.S. Appl. No. 14/626,632", dated Jul. 27, 2016, 17 Pages.

"Final Office Action Issued in U.S. Appl. No. 14/626,632", dated Mar. 9, 2017, 17 Pages.

"Non Final Office Action Issued in U.S. Appl. No. 14/626,632", dated Sep. 14, 2016, 18 Pages.

"Non Final Office Action Issued in U.S. Appl. No. 14/626,632", dated Mar. 15, 2016, 19 Pages.

"Non Final Office Action Issued in U.S. Appl. No. 14/626,681", dated Feb. 22, 2017, 14 Pages.

"Notice of Allowance Issued in U.S. Appl. No. 14/626,681", dated Jul. 14, 2017, 8 Pages.

Brown, Gary S., "Change Resolution With Driver MFT", Retrieved from <<https://social.msdn.microsoft.com/Forums/expression/en-US/8b07cee4-af00-4bbe-9921-a0e321565968/change-resolution-with-driver-mft?forum=tailoringappsfordevices>>, Feb. 5, 2013, 4 Pages.

Chatterjee, "Microsoft DirectShow: A New Media Architecture", In SMPTE Journal, vol. 106, Issue 12, Dec. 1997, pp. 865-871.

Cortelazzo, et al., "Statistical Characteristics of Granular Camera Noise", In Proceedings of IEEE Transactions on Circuits and Systems for Video Technology, vol. 4, Issue 06, Dec. 1994, pp. 536-543.

Hofherr, Martin, "Low Latency Image Processing With Extensible Processing Platform", In Dissertation Submitted for the Partial Fulfillment of Diploma Thesis in Faculty of Engineering and Computer Science, Ulm University, Dec. 19, 2012, 85 Pages.

Hunt, Galen C, "Creating User-Mode Device Drivers with a Proxy", In Proceedings of the USENIX Windows NT Workshop on the USENIX Windows NT Workshop, Aug. 11, 1997, 6 Pages.

Kapasi, et al., "Programmable Stream Processors", Published in IEEE Computer Society, vol. 36, Issue 08, Aug. 11, 2003, pp. 54-62.

Leslie, et al., "User-level Device Drivers: Achieved Performance", In Journal of Computer Science and Technology, vol. 20, Issue 5, Sep. 1, 2005, 17 Pages.

"International Preliminary Report on Patentability Issued in PCT Application No. PCT/US2016/012781", dated Nov. 28, 2016, 9 Pages.

"International Search Report and Written Opinion Issued in PCT Application No. PCT/US2016/012781", dated Apr. 7, 2016, 13 Pages.

"Second Written Opinion Issued in PCT Application No. PCT/US2016/012781", dated Aug. 3, 2016, 9 Pages.

"International Preliminary Report on Patentability Issued in PCT Application No. PCT/US2016/013909", dated Dec. 8, 2016, 7 Pages.

"International Search Report and Written Opinion Issued in PCT Application No. PCT/US2016/013909", dated Apr. 28, 2016, 12 Pages.

Sinha, Prokash, "High-Performance NDIS Miniport/NIC Design", Retrieved from <<https://web.archive.org/web/20110809094838/http://www.ndis.com/ndis-design/prokash/default.htm>>, Aug. 18, 2010, 18 Pages.

Tanenbaum, Andrew S., "Modem Operating Systems", In book of Modem Operating Systems, Second Edition, 2001, 18 Pages.

Weston, Brad, "The Basics of Video Keying", Retrieved from <<https://www.renewedvision.com/downloads/tfwm_keying_article.pdf>>, Jul. 2009, pp. 23-26.

"First Office Action and Search Report Issued in Chinese Patent Application No. 201680006401.5", dated Jun. 5, 2019, 15 Pages.

* cited by examiner

MEMORY DESCRIPTOR LIST CACHING AND PIPELINE PROCESSING

CROSS-REFERENCE TO RELATED APPLICATION(S)

This application is a continuation of U.S. patent application Ser. No. 14/626,681, filed Feb. 19, 2015, entitled "MEMORY DESCRIPTOR LIST CACHING AND PIPELINE PROCESSING," which claims priority to U.S. Provisional Application No. 62/105,129, filed Jan. 29, 2015, entitled "MEMORY DESCRIPTOR LIST CACHING AND PIPELINE PROCESSING". The entirety of each of these afore-mentioned applications is incorporated herein by reference.

BACKGROUND

Conventional techniques used to capture images using an image capture device of a computing device store the images in buffers for processing by pipelines. The buffers are created and then accessed using probe, lock, and map operations each time the buffer is to be accessed. As this access can take several milliseconds each time the operations are performed, this can have a significant effect on operating efficiency due to the number of times the buffers are accessed, especially when confronted with the ever increasing sizes of images being captured.

SUMMARY

Memory descriptor list caching and pipeline processing techniques are described. In one or more examples, a method is configured to increase efficiency of buffer usage within a pipeline of a computing device. The method includes creation of a buffer in memory of the computing device and caching of a memory descriptor list by the computing device that describes the buffer in a buffer information cache and has associated therewith a handle that acts as a lookup to the memory descriptor list. The method also includes passing the handle through the pipeline of the computing device for processing of data within the buffer by one or more stages of the pipeline such that access to the data is obtained by the one or more stages by using the handle as the lookup as part of a call to obtain the memory descriptor list for the buffer from the buffer information cache.

In one or more examples, a method is described to increase efficiency of access to data within a buffer by a pipeline of a computing device. The method includes receiving a handle by at least one stage of the pipeline of the computing device that is to access the data within a buffer, making a call by the at least one stage to a source of the handle to obtain a memory descriptor list by the computing device that describes the buffer through use of the handle as a lookup in a buffer information cache, and using the obtained memory descriptor list by the at least one stage to access the data within the buffer.

In one or more examples, a computing device is configured to increase efficiency of buffer usage within a pipeline of the computing device. The computing device includes a processing system configured to perform one or more operations and memory configured to maintain instructions that are executable by the processing system to implement an operating system. The operating system is configured to create a buffer in the memory by performing a probe, lock, and map operation; cache a memory descriptor list that describes the buffer in a buffer information cache and has associated therewith a handle that supports a lookup to the memory descriptor list; receive the handle by at least one stage of the pipeline that is to access the data within a buffer; make a call by the at least one stage to a source of the handle to obtain the memory descriptor list; and use the memory descriptor list by the at least one stage to access the data within the buffer.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Camera pipelines conventionally perform probe, lock, and map operations each time access to a buffer is desired, even when initially capturing data (e.g., an image) to the buffer when sent down to a device driver, e.g., a kernel mode capture driver. As these operations can consume several milliseconds each time the operation is performed, this amount of time can quickly add up, especially when confronted with a large buffer size (e.g., to store ever increasing image sizes), increases in an amount of time involved in a capture session, and so forth. As such, these conventional techniques could result in significant performance and power degradation.

Memory descriptor list and cache processing techniques are described. In one or more implementations, a memory descriptor list is cached in a buffer information cache and associated with handles usable to perform a lookup to locate a desired memory descriptor list. The memory descriptor list describes a buffer allocated in memory of a computer device. Accordingly, a buffer is created by a probe, lock, and map operation and a memory descriptor list that describes this buffer (e.g., a location, size, and so forth) is stored in a buffer information cache.

The memory descriptor list in the buffer information cache is associated with a handle that is passed to downstream components that may desire access to the buffer, such as stages in a pipeline having kernel-side components that access the buffer, a sink, and so forth. In this way, these components use the handle to avoid the repeated probe, lock, and map operations and thereby improve efficiency of access to the buffer and thus available resources of a computing device as a whole. Further examples of these and other techniques are described in the following sections and shown in corresponding figures.

Example Environment

Figure 1:
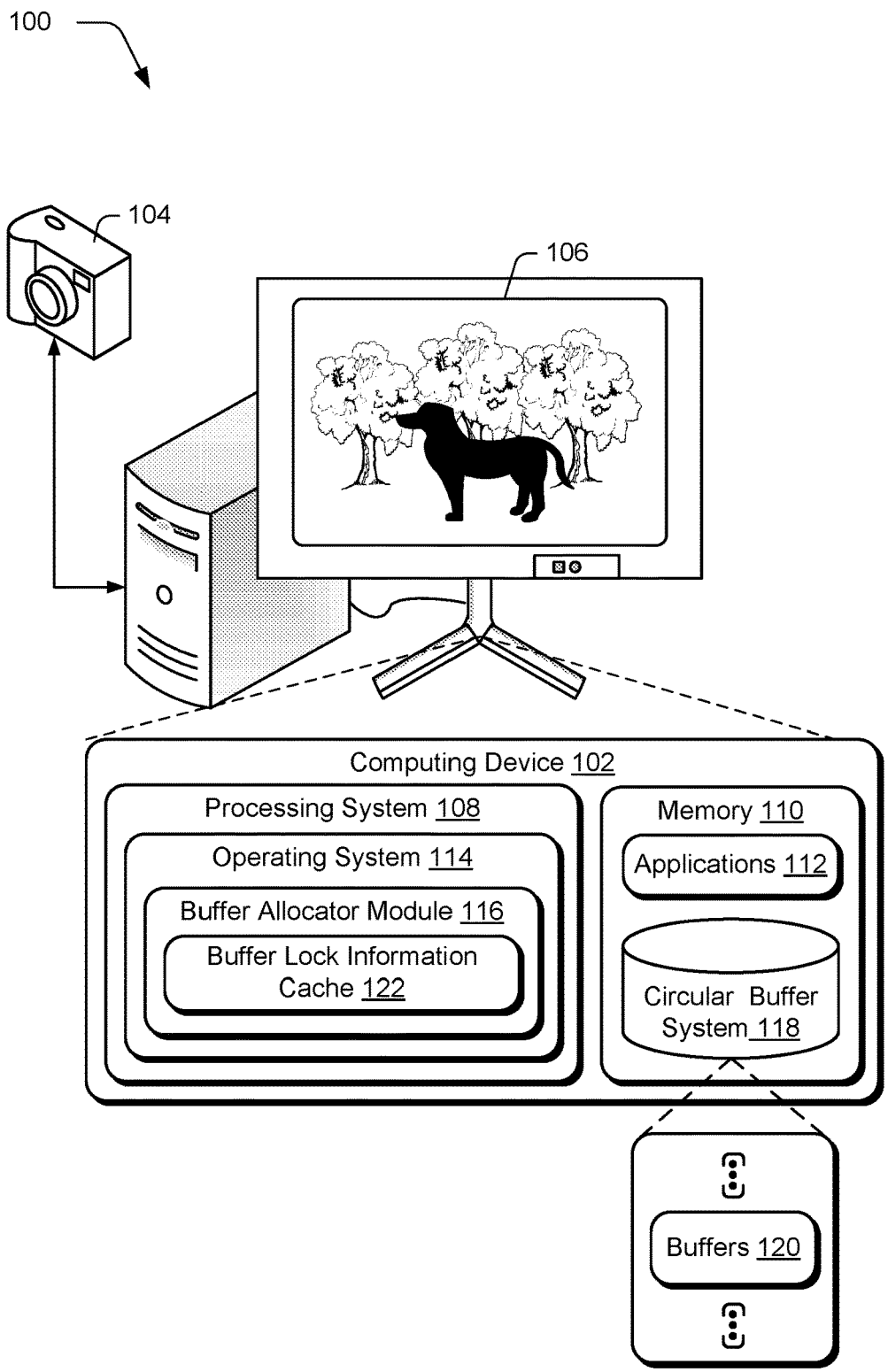
FIG. 1 is an illustration of an environment in an example implementation that is operable to employ the memory descriptor list caching and pipeline processing techniques described herein.

FIG. 1 is an illustration of an environment 100 in an example implementation that is operable to employ the memory descriptor list caching and pipeline processing techniques described herein. The illustrated environment 100 includes an example of a computing device 102, which is illustrated as a desktop PC that is communicatively coupled to a device (e.g., peripheral device), an example of which is illustrated as a camera 104 but other examples are also contemplated, such as three-dimensional printers, audio capture devices, sensors, and so forth. Another example of such a device is illustrated as a display device 106. Although illustrated separately, the device may also be incorporated as an integral part of the computing device 102, such as a tablet configuration having a camera, display device, microphone, and so forth.

Figure 7:
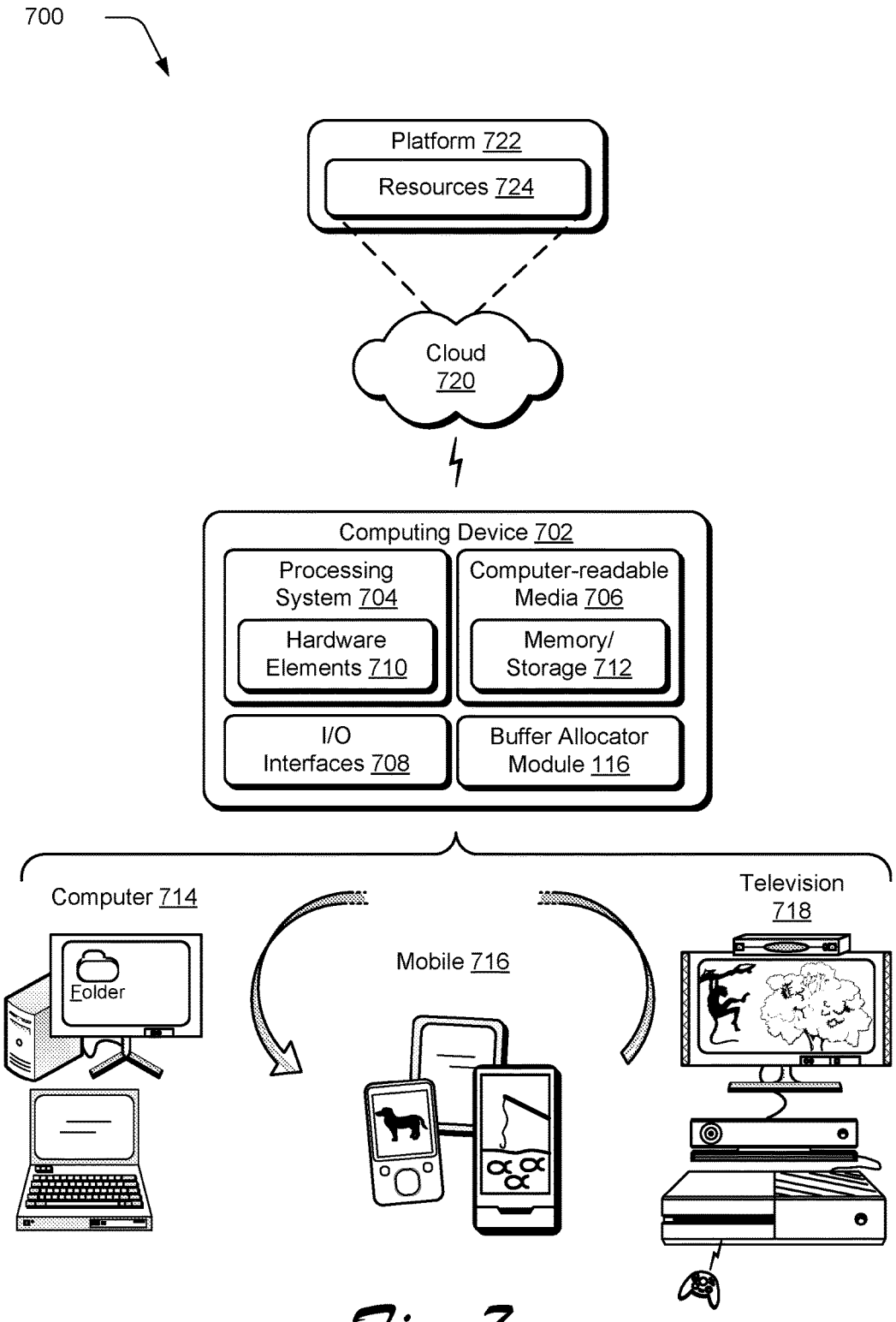
FIG. 7 illustrates an example system including various components of an example device that can be implemented as any type of computing device as described with reference to FIGS. 1-6 to implement embodiments of the techniques described herein.

The computing device 102 is configurable in a variety of ways, such as a traditional computer (e.g., a desktop personal computer, laptop computer, and so on), a mobile station, an entertainment appliance, a wireless phone, a tablet, a netbook, and so forth as further described in relation to FIG. 7. Thus, the computing device 102 may range from full resource devices with substantial memory and processor resources (e.g., personal computers, game consoles) to a low-resource device with limited memory and/or processing resources (e.g., traditional set-top boxes, hand-held game consoles). The computing device 102 may also relate to software that causes the computing device 102 to perform one or more operations.

The computing device 102 is also illustrated as including a variety of hardware components, example of which include a processing system 108, and an example of computer-readable storage media, which in this instance is memory 110. The memory 110 is configured to maintain applications 112 and other software that are executable by the processing system 108 to perform one or more operations.

The processing system 108 is not limited by the materials from which it is formed or the processing mechanisms employed therein. For example, the processing system 108 may be comprised of semiconductor(s) and/or transistors (e.g., electronic integrated circuits (ICs)), such as a system on a chip, processors, central processing units, processing cores, functional blocks, and so on. In such a context, executable instructions may be electronically-executable instructions. Alternatively, the mechanisms of or for processing system 108, and thus of or for a computing device, may include, but are not limited to, quantum computing, optical computing, mechanical computing (e.g., using nanotechnology), and so forth. Additionally, although a single memory 110 is shown, a wide variety of types and combinations of memory may be employed, such as random access memory (RAM), hard disk memory, removable medium memory, and other types of computer-readable storage media.

The computing device 102 is further illustrated as including an operating system 114. The operating system 114 is configured to abstract underlying functionality of the computing device 102 to applications 112 that are executable on the computing device 102. For example, the operating system 114 may abstract the processing system 108, memory 110, network, input/output, and/or display functionality of the display device 108, and so on such that the applications 112 may be written without knowing "how" this underlying functionality is implemented. The application 112, for instance, may provide data to the operating system 114 to be rendered and displayed by the display device 106 without understanding how this rendering will be performed. The operating system 114 may also represent a variety of other functionality, such as to manage a file system and user interface that is navigable by a user of the computing device 102.

An example of this functionality is illustrated as a buffer allocation module 116. The buffer allocation module 116 is representation of functionality of the operating system 114 or elsewhere to maintain a circular buffer system 118 having a plurality of buffers 120. The buffers 120 are used to maintain data obtained from a device, such as images captured from the image capture device 104. In this example, the buffers 120 are maintained in a circular buffer system 118 by the buffer allocator module 116 that supports reuse of the buffers 120. Thus, use of the buffers 120 is circular, e.g., to capture and release an image and repeat for subsequent images. As previously described, however, repeated access to the buffers 120 using conventional techniques could consume a significant amount of resources (e.g., processing, memory, and power resources in mobile applications) as well as time involving in performing the operations.

Accordingly, in this example the buffer allocation module 116 is configured to maintain a buffer lock information cache 122 that includes descriptions of each of the buffers 120 that are created. By maintaining the descriptions in the buffer lock information cache 122, the buffer allocation module 116 is able to facilitate avoidance of repeated use of the probe, lock, and map operations and thus improve efficiency of operation of the computing device 102, further description of this is described in the following and shown in a corresponding figure.

Figure 2:
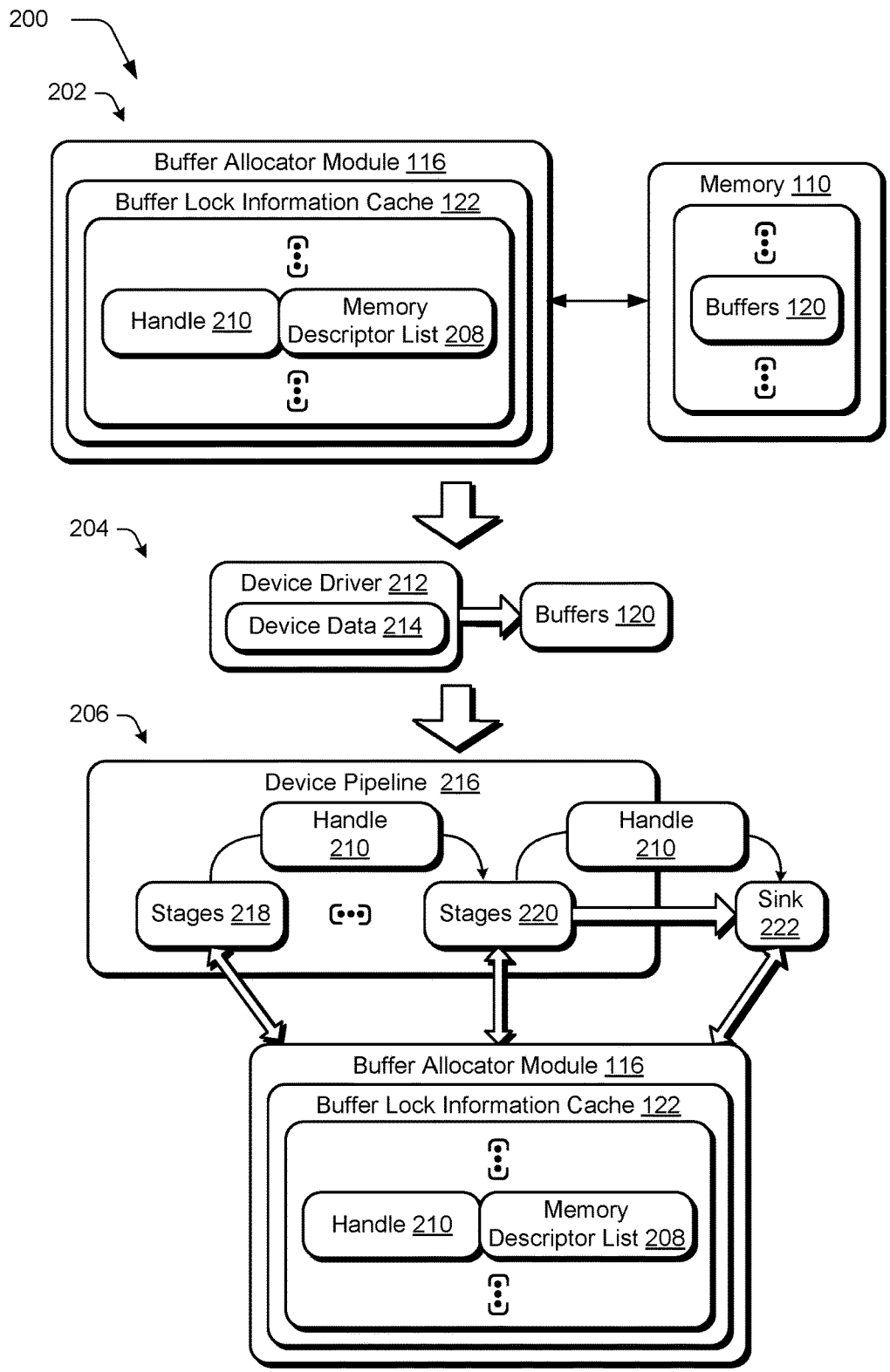
FIG. 2 depicts a system in an example implementation in which use of a buffer lock information cache to manage access to buffers is shown.

FIG. 2 depicts a system 200 in an example implementation in which use of the buffer lock information cache 112 to manage access to buffers 120 is shown. The system 200 is illustrated using first, second, and third stages 202, 204, 206. At the first stage 202, the buffer allocator module 116 creates buffers 120 in memory 110 of the computing device 102. The buffer allocator module 116, for instance, performs a probe, lock, and map operation to locate portions of the memory 110 that are suitable for use as a buffer and when found, locks those portions from use by other functionality of the computing device 102 and maps those portions as buffers 120. This information may be referred to as a memory descriptor list 208 and is stored in the buffer lock information cache 122 such that the buffer 120 may be located again and reused as further described below.

The memory descriptor list 208 is associated with a handle 210. The handle 210 is usable as a lookup (e.g., through use as an index) to locate a corresponding memory descriptor list 208. In this way, the handle 210 is usable to obtain the memory descriptor list 208 and from that access to a corresponding buffer 120 as further described below.

At the second stage 204, for instance, a device driver 212 is used to capture device data 214 and load it to a buffer 120. The device driver 212 may correspond to a camera 104 and thus cause loading of an image captured by the camera 104 into the buffer 120. To do so, the buffer allocator module 116 passes the handle 210, which is then used to obtain the memory descriptor list 208 and find the corresponding buffer 120. Once the device data 214 (e.g., the image) is written to the buffer 120, the device driver 212 releases the buffer 120 back to the buffer allocator module 116. In this way, access to the buffer 120 is obtained using the handle 210 without repeating the probe, lock, and map operation.

This process is continued for subsequent components that desire access to the data in the buffer 120. For example, the handle 210 is used to pass access to the buffer 120 to a device pipeline 216. The device pipeline 216 includes a plurality of stages 218, 220 that are used to process the device data 214, e.g., one or more transforms involved in image processing in a camera example, and further, such as to a sink 222 to store, communicate, or render data in the buffer 120. Stage 218, for instance, may use the handle 210 as part of a lookup to obtain the memory descriptor list 208 describing the buffer 120. The stages 218 pass the handle 210 to the buffer allocator module 116, which then uses the handle 210 as a lookup to locate the memory descriptor list 208, which is then provided back to the stage 218.

The stage 218 may then access the buffer 120, such as to employ related hardware components, kernel mode functionality, and so on to process the device data 214 within the buffer 120, e.g., hardware JPEG encoder in a camera 104 example in which the device pipeline 216 is an image processing pipeline. Once the processing is completed, the handle 210 is passed to a subsequent stage 222, the sink 222, and so on to perform similar access techniques.

Thus, the buffer lock information cache 122, memory descriptor list 208, and handle 210 support functionality usable to access the buffer by "downstream" components without repeating the probe, lock, and map operations. Once use of the device data 214 within the buffer 120 is completed (e.g., rendered, stored, or communicated by the sink 222) the buffer 120 is released by the buffer allocator module 116 as part of the circular buffer system 118 for reuse (e.g., to capture another image), which may also be performed without repeating the probe, lock, and map operations. These techniques are also usable within a user mode/kernel mode context, an example of which is described in the following and shown in a corresponding figure.

Figure 3:
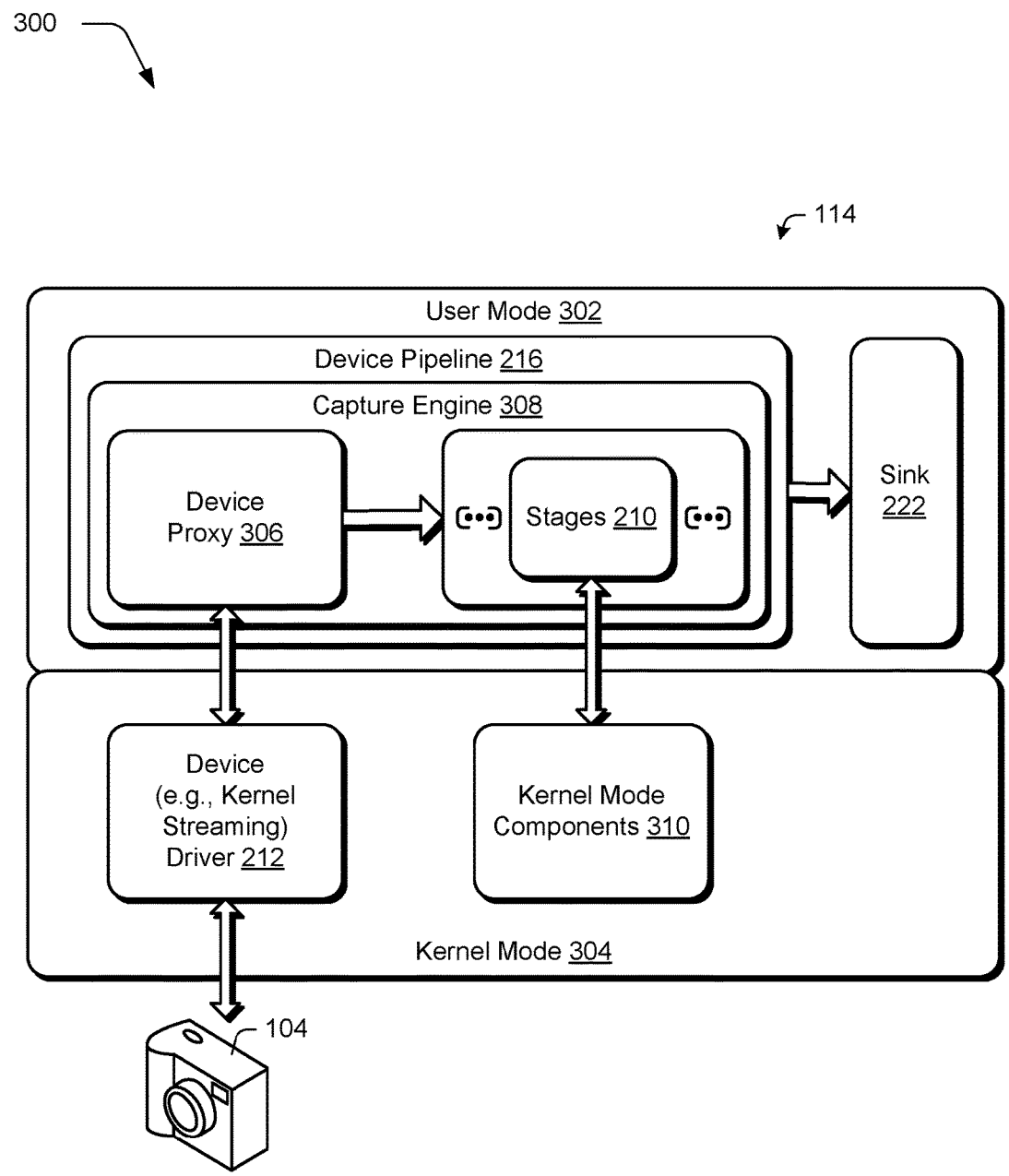
FIG. 3 depicts a system in an example implementation in which functionality of a buffer allocator module, buffer lock information cache, and memory descriptor list of FIG. 2 are employed in a user and kernel mode context of an operating system.

FIG. 3 depicts a system 300 in an example implementation in which functionality of the buffer allocator module 116, buffer lock information cache 122, and memory descriptor list 208 are employed in a user and kernel mode 302, 304 context of an operating system 114. The operating system 114 includes a kernel mode 116 and a user mode 118 in this example. The processing system 108 of FIG. 1, under control of the operating system 114, switches between these modes depending on a type of code that is being executed. For example, applications 112 are executed in user mode 118 and parts of the operating system (e.g., kernel components) are executed in the kernel mode 116.

In order to execute an application 112 in the user mode 118, the operating system 114 creates a process for the application 112. The process provides the application 112 with a private virtual address space and a private handle table. Because an application's 112 virtual address space is private, one application cannot alter data that belongs to another application and thus each application is executed in isolation. Accordingly, if an application 112 crashes, the crash is limited to that application 112 and as such other applications and the operating system 114 are protected from the crash, e.g., continue to execute.

In addition to being private, the virtual address space of the application 112 is limited in the user mode 118. As such, access to virtual addresses that are reserved for the operating system 114 is not permitted from the user mode 118. An entirety of the code that runs in kernel mode 116, however, shares a single virtual address space.

In the illustrated example, a device driver 212 (e.g., a kernel streaming driver) is executed within the kernel mode 304. A device proxy 306 is executed within a capture engine 308 of a device pipeline 216. The device proxy 306 represents the device 104 to the stages 210 of the device pipeline 216. Thus, streams output by the device proxy 306 are viewed by the stages 210 as streams output by the device 104 itself.

One or more of the stages 210 in this example include kernel mode components 310 as part of the processing performed by the stages 210. In the illustrated example of a camera 104, for instance, the kernel mode components 310 are executed within the kernel mode 304 to interface with image processing hardware, e.g., a hardware JPEG encoder. Use of the buffer lock information cache 122, memory descriptor list 208, and handles 210 are also usable within this context.

In this example, the device proxy 306 creates a Pin object using a call "NtCreateFile," e.g., directly or indirectly using a device access broker, depending whether the process is an application container. A "file_object" is created in the kernel mode 304 and a handle 210 (e.g., handle object) is stored in the user mode 302, e.g., in the device proxy. This handle 210 supports a unique lookup into the kernel object, which leads to a kernel streaming Pin object in this example.

The device proxy 306 uses a call (e.g., "deviceiocontrol") with the user mode handle 210 for capturing device data 214 and forwarding control commands to the device 104 (e.g., camera) via a device driver, e.g., "KSPROPERTY," Extended properties and "IOCTL_KS_WRITE_STREAM/ IOCTL_KS_READ STREAM."

Read buffers used for capture are configured as "NEITHER_IO" and are probed and locked by the device driver 212 on each trip to the kernel mode 304 and are released when going back to the user mode 302.

The buffers 120 are passed down the device pipeline 216, where the buffers are also passable to other discreet kernel mode components 310 leverage by the pipeline. These kernel mode components 310 may also lock and probe the buffer 120.

In one or more implementations, an opt-in mechanism is supported to lock the buffers 120 and cache the corresponding memory descriptor lists 208 in the buffer lock information cache 122, e.g., as a "CKsQueue" object in a kernel streaming space. This technique is also extendable to other types of buffers (e.g., DX buffers), which also results in corresponding improvements in efficiency as described above.

The following design may be enabled as part of these techniques. For a driver, functionality is added to change to make this feature an opt-in for the clients of device driver 212, through use of a flag to a "KSALLOCATOR_FRAMING_EX" structure, so that "DECLARE_SIMPLE_FRAMING_EX" adds the additional flag defined below in header file:
define KSALLOCATOR_ENABLE_MDL_CACHING 0x00004000 (Note: This could also be implemented as a separate extended property control)

Additionally functionality usable to support this design are as follows.

For the device driver 212, a union of the handle and a buffer payload in a header file, e.g., "ks.h," is formed. This is constructed by the device proxy 206 when a buffer returns from the round trip to the kernel mode 304. The union is used in API calls to retrieve the Pin object, where the memory descriptor lists 208 are stored, an example of which is described as follows:

```
//
//MDL sharing related definitions
//
typedef union_MF_MDL_SHARED_PAYLOAD_KEY{
    struct {
        ULONG64 handle; /* User mode Pin Handle from DevProxy */
        ULONG64 upayload; /* The PayLoad from IMFSample    */
    }combined;
    GUID cGMDLHandle;
}MF_MDL_SHARED_PAYLOAD_KEY;
//
//We need the handle and upayload to be ULONG64
//to adjust for 64 bit systems and 32 bit systems
//
#define MF_SET_SHARED_MDLHANDLE(a,b,c){\
    c.combined.handle = (ULONG64)a;\
    c.combined.upayload = (ULONG64)b;\
}
```

Two external application programming interfaces (APIs) are defined. First, an API "KsGetPinnedMemoryMdlFromHandle" is defined to obtain the locked memory descriptor lists 208 based on a globally unique identifier, e.g., extracted from the "IMFSample." A reference is added on the sample in the list stored in device driver 212. Secondly, an API "KsReleaseMemoryMdlFromHandle" is defined to free the reference on the sample when the kernel mode component 310 is done accessing the memory descriptor list 208.

A cancellation routine is also defined, which is used by the device driver 212 to notify the kernel mode components 310 using the memory descriptor lists 208 about destruction of the memory descriptor lists 208 as follows:
Cancellation Routine:

```
_IRQL_requires_max_(DISPATCH_LEVEL)
typedef
VOID
(*PFNKSCANCELPINNEDMDL)(
    _In_ PGUID,
    _Out_ PMDL
);
```

External API:

```
_Must_inspect_result_
_IRQL_requires_max_(DISPATCH_LEVEL)
KSDDKAPI
NTSTATUS
NTAPI
KsGetPinnedMemoryMdlFromHandle(
    _In_ PGUID* Guid,
    _In_ PFNKSCANCELPINNEDMDL CancelRoutine,
    _Out_ PVOID *MdlAddr
);
KSDDKAPI
NTSTATUS
NTAPI
KsReleaseMemoryMdlFromHandle(
    IN PGUID pGuid, /* The GUID from the sample passed on from devproxy!!!*/
    IN PMDL mdl // The MDL returned from a previous call to KS to retrive the MDL
);
//
//End of MDL sharing related definitions
//
```

An additional flag may be set on the "KSSTREAM_HEADER" to indicate to the device driver 212 that the buffer 120 is cached in the buffer lock information cache 122, an example of which follows:
define KSSTREAM_HEADER_OPTIONSF_PERSIST_MDL 0x00008000

The following describes storage of the memory descriptor lists 208 as part of the device driver 212. The memory descriptor lists 208 may be stored in a list (e.g., "LIST_ENTRY") data structure. This list is a part of the Queue object described above. The List is synchronized with a "MUTEX," thereby restricting the call to IRQL<DISPATCH_LEVEL. An example of this arrangement is described as follows:

```
typedef struct_LockedMDL_Allocator_Struct{
    LIST_ENTRY Entry;
    PMDL mdl;           //Saving the MDL
    PUCHAR Data;        //Data associated with the sample
    ULONG RefCount;     //Reference counted
    PFNKSCANCELPINNEDMDL CancelRoutine; //Cancel Routine, when Pin is terminated
}LockedMDL_Allocator_Struct, *PLockedMDL_Allocator_Struct;
```

Acquire and release semantics are usable for acquiring and releasing the memory descriptor list 208. The device driver 120 keeps track of the acquirers and manages this access such that only a single component acquires the memory descriptor list 208 at any one time. The data structure storing the memory descriptor list 208 is reference counted and the caller supplies a cancellation routine.

When use of the memory descriptor list 208 is finished by a component, the device driver 212 is notified using a release call and then no longer uses the memory descriptor list 208 as that subsequent use could cause an error.

Components requesting access to the memory descriptor list 208 are able to handle calls failures, i.e. not retrieving memory descriptor list 208. In that case, for instance, the component reverts back to probe, lock, and map operations to obtain the system address from the buffer 212. This may occur, for instance, because of a low memory event being set in the kernel by a memory subsystem.

An acquire call, e.g., "KSGETPINNEDMEMORYMDL-FROMHANDLE" has an input parameter globally unique identifier, which is retrieved from "IMFSample" as previously described and then passed to kernel mode 304, e.g., by a private interface with a discreet kernel mode driver.

The globally unique identifier in this example is split up into a user mode handle and the buffer. The kernel mode "FILE_OBJECT" is obtained from the user mode handle as described above.

Multiple checks may be enforced before the "FILE_OBJECT" is treated as a Pin Object, e.g., i) If the Object is a FILE OBJECT. This will protect us against a handle recycle.

ii) If the Object is a KS Object?

iii) If the Object is a Pin?

The reference on the Pin is incremented so that it is not lost during the call. The Pin control lock is acquired during the call, so that queue is not lost when the call is in progress. The list in the queue is scanned and memory descriptor language 208 returned if no other client has already made a request. The reference count on the Pin is released when the calls returns.

The release call "KSRELEASEMEMORYMDLFROMHANDLE" decrements the reference count on the memory descriptor language 208, which was taken when memory descriptor language 208 was requested.

External calls are also utilized to support efficient buffer 120 access. For example, a check is performable to determine if the flag "KSSTREAM_HEADER_OPTIONSF_PERSIST_MDL" is set, and if so, probing is stopped.

In some instance, an amount of free space in the memory 110 available for buffers 120 drops below a threshold, which causes the operating system 114 to notify registered observers. In response to such an event (e.g., Low Memory notification event), exposed by the kernel instead of spawning a separate thread, a check is performed to determine if the event is signaled when an attempt is made to access the list, and accordingly prunes the attempt. Additionally, memory descriptor lists 208 are cached solely when streaming is active, hence a "Wait on the dispatcher object" operation is performed to have a zero timeout wait. This prevents context switches which would have resulted had the wait been a non-zero one. If the event is set then the memory descriptor lists 208 list will be pruned, i.e., the memory descriptor lists 208 are not be cached till the event goes into un-signaled state.

In an example of use of flags to control probing, "KSTHUNK.sys" is class filter driver which is activated for 32 bit applications and is a pass through for 64 bit applications in a device stack. The below call handles THUNKING and locking for device driver.

IRP_DISPOSITION

CKSThunkPin::

ThunkStreamingIrp

This function skips the probing and locking if the stream header advertises the flag set by device proxy 306 or the device driver 212.

The following describes techniques usable to obtain memory descriptor lists 208 by the device pipeline 216, e.g., "MFCORE" and "MFPLAT." For "MFCORE," a globally unique identifier (GUID) is used to set an attribute by the device proxy 306 on the sample. The payload which is a GUID is retrieved by a call (e.g., "GetGUID") and then be passed to any kernel mode component 310 to retrieve memory descriptor lists 208.

//MFSampleExtension_MDLCacheCookie

//Type: IUnknown (IMFAttributes)

//This is the IMFAttributes stored in the sample if the mini driver

//desires to cache MDL's. This is used internally by the pipeline.

//{5F002AF9, 0xD8F9, 0x41A3, 0xB6, 0xC3, 0xA2, 0xAD, 0x43, 0xF6, 0x47, 0xAD}

DEFINE_GUID(MFSampleExtension_MDLCacheCookie, 0x5F002AF9, 0xD8F9, 0x41A3, 0xB6, 0xC3, 0xA2, 0xAD, 0x43, 0xF6, 0x47, 0xAD)

For "MFCORE", this entity skips allocation of the metadata buffer each time the "MFSampleExtension_CaptureMetadata" attribute is set on a sample.

The buffer allocator module 116 is configured to prune itself when memory samples are available for feeding the device driver 212 and there is no starvation. When the buffer allocator module 116 is pruned some samples are removed, and the device driver 212 is notified on opt in.

A property "KSPROPERTY" is included as part of the device driver 212 that is sent to the Pin from device proxy 306 so that the device driver 212 is able to release the memory descriptor list 208 associated with the sample.

```
class CKsBasePin
   : public IKsObject
      ,public IKsControl
      ,public CMFAttributesImpl<IMFAttributes>
      ,public IKsStream
      ,public IMFVideoSampleAllocatorNotifyEx □ This is a change in
Interface
```

CKsBasePin inherits from IMFVideoSampleAllocatorNotifyEx instead of IMFVideoSampleAllocatorNotify. Method NotifyPrune is added in the CKsBasePin class in Dev Proxy, which calls the KSPROPERTY to release the sample involved.

The method "NotifyPrune" is called when allocator samples are released for pruning by the buffer allocator module 116 in "MFPLAT" and are also called when the allocator is terminated. Calls are segregated by an enumeration, which differentiates a prune from a cleanup. A method "NotifyPrune" calls the "KSPROPERTY" into the device driver 212. The device driver 212 cleans up the memory descriptor list 208 corresponding to the buffer 120 being pruned.

The buffer allocator module 116 is configured such that the sample metadata and the GUID payload is not cleared when returned back to the buffer allocator module 116. This may involve a change in an "OnInvokeDelete" function in the "CMFDXAllocator" class. If the GUID is set on the sample, then it is persisted for the next run of the sample. An interface "IMFVideoSampleAllocatorNotifyEx" is used along with a method "NotifyPrune" to call back into device proxy 306 to release a locked sample.

Memory allocated for the metadata is persisted acrosssSample returns to the buffer allocator module 116. This is an optimization for the device proxy 306, which allocates and releases a fresh buffer for metadata, e.g., on each trip to the device driver 212.

The below describes an example usable by client drivers to make use of the caching feature:

```
DECLARE_SIMPLE_FRAMING_EX(
ImageCapturePinAllocatorFraming,
STATICGUIDOF(KSMEMORY_TYPE_KERNEL_NONPAGED),
KSALLOCATOR_REQUIREMENTF_SYSTEM_MEMORY |
KSALLOCATOR_REQUIREMENTF_PREFERENCES_ONLY,
KSALLOCATOR_REQUIREMENTF_PREFERENCES_ONLY     |
KSALLOCATOR_FLAG_PINNED_KS_MEM,
4,
0,
2 * PAGE_SIZE,
2 * PAGE_SIZE
);
```

It is a flag "OR'd" to "ALLOCATOR_FRAMING" flags that the client driver exports, e.g., in "KSPIN_DESCRIPTOR_EX" definitions. This turns on memory descriptor list 208 caching, if the buffer allocator module 116 is allocating system memory buffers.

A public API for determination of whether to perform a probe and lock is described in the following that takes two input parameters. The first input parameter is a GUID which is a combination of a user mode file handle and a user mode locked address. The user address is a key into a data structure used to store the memory descriptor lists 208 used. This does not use a probe and lock operation.

A cancellation routine is also supplied by the external component asking for the pinned memory descriptor list 208. The memory descriptor list 208 is non null and contains a valid memory descriptor list 208 address. The memory descriptor list 208 stored in the queue is returned back to the caller if it is found in the queue. If not found, then a suitable error is returned to the caller.

```
Must_inspect_result_
    _IRQL_requires_max_(DISPATCH_LEVEL)
KSDDKAPI
NTSTATUS
NTAPI
KsGetPinnedMemoryMdlFromHandle(
    _In_ PGUID* Guid,
    _In_ PFNKSCANCELPINNEDMDL CancelRoutine,
    _Out_ PVOID *MdlAddr
    );
```

The following API accepts two input parameters, e.g., a GUID which is a sample attribute set by the device proxy 306 and a memory descriptor list 208 that is returned by a device driver 212:

```
KSDDKAPI
NTSTATUS
NTAPI
KsReleaseMemoryMdlFromHandle(
    IN PGUID pGuid, /* The GUID from the sample passed on fromdevproxy*/
    IN PMDL mdl // The MDL returned from a previous call to KS to retrive the MDL
    );
```

As a result, the call returns "STATUS_SUCCESS" if the GUID and memory descriptor list 208 are valid for the Pin and User mode Buffer/MDL combination. Further discussion of these and other examples are described in relation to the following procedures and shown in corresponding drawings.

Example Procedures

The following discussion describes memory descriptor list caching and pipeline processing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-3 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 4:
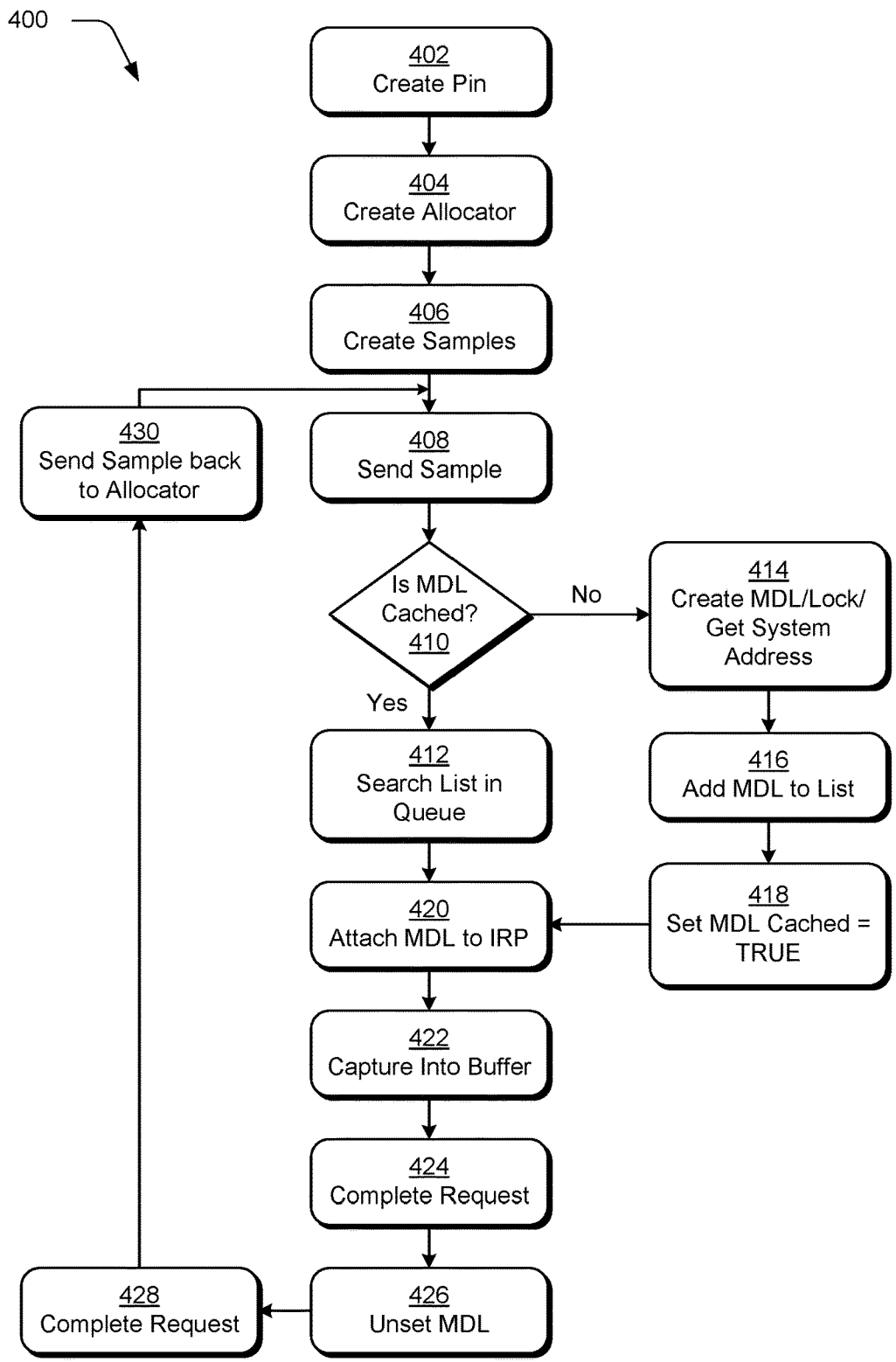
FIG. 4 is a flow diagram depicting a procedure in an example implementation showing creation and use of a memory descriptor list.

FIG. 4 depicts a procedure 400 in an example implementation showing creation and use of a memory descriptor list 208. A pin is created (block 402) along with instantiation of a buffer allocator module 116 (block 404). Samples (e.g., images or other data) are created (block 406) and sent (block 408).

A determination is made at decision block 410 as to whether a memory descriptor list 208 is cached. If so ("yes" from decision block 410) a search is performed in the queue (block 412). If not ("no" from decision block 410) a memory descriptor list is created as part of a lock and a system address is obtained for a buffer so created (block 414).

The memory descriptor list is added to a list in the queue (block 416) and a flag is set to indicate that the memory descriptor list 208 is available in the queue (block 418). The memory descriptor list 208 is added to an IRP (block 420) and data is captured into the buffer (block 422). Once the request is completed (block 424) the memory descriptor list 208 is unseated (block 426) and the request is completed (block 428) such that the sample is sent back to the buffer allocation module. A variety of other examples are also contemplated.

Figure 5:
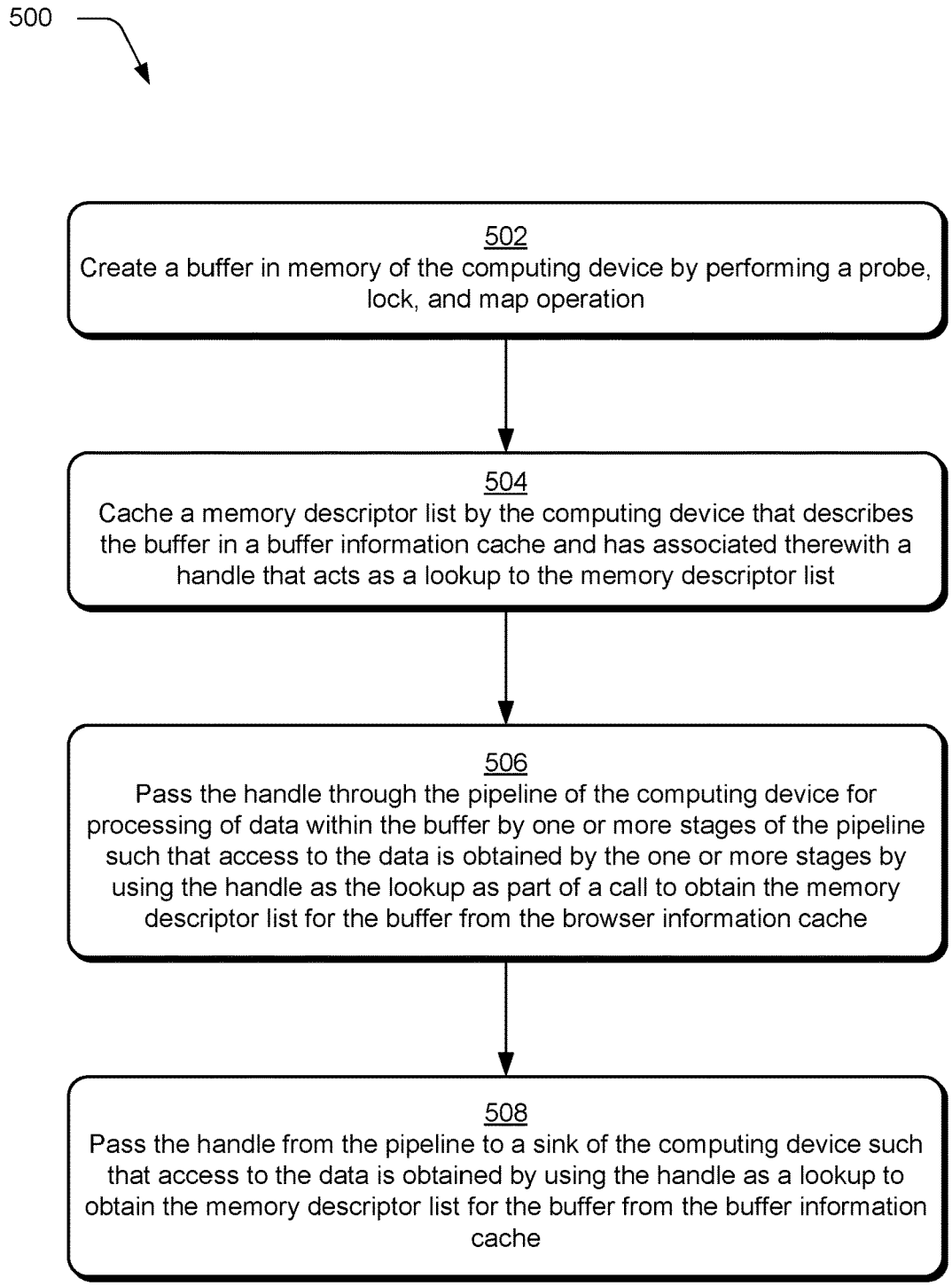
FIG. 5 is a flow diagram depicting a procedure in an example implementation in which a buffer is created and handles are used to pass access to the buffer through use of cached memory descriptor lists.

FIG. 5 depicts a procedure 500 in an example implementation in which a buffer is created and handles are used to pass access to the buffer through use of cached memory descriptor lists. In this example, a method is described to increase efficiency of buffer usage within a pipeline of a computing device. A buffer is created in memory of the computing device (block 502), e.g., by performing a probe, lock, and map operation.

A memory descriptor list is cached by the computing device that describes the buffer in a buffer information cache and has associated therewith a handle that acts as a lookup to the memory descriptor list (block 504). A memory descriptor list 208, for instance, is associated with handles 210 as part of a buffer lock information cache 122.

The handle is passed through the pipeline of the computing device for processing of data within the buffer by one or more stages of the pipeline such that access to the data is obtained by the one or more stages by using the handle as the lookup as part of a call to obtain the memory descriptor list for the buffer from the buffer information cache (block 506), e.g., without repeating the probe, lock, and map operation. In this way, access to the buffer 120 is obtainable in an efficient manner by the stages 218, 220.

The handle is passed from the pipeline to a sink of the computing device for processing of data within the buffer by one or more stages of the pipeline such that access to the data is obtained by the one or more stages by using the handle as the lookup as part of a call to obtain the memory descriptor list for the buffer from the buffer information cache (block 508), e.g., without repeating the probe, lock, and map operation. Likewise, access to the buffer 120 is obtainable in an efficient manner by the sink 222.

Figure 6:
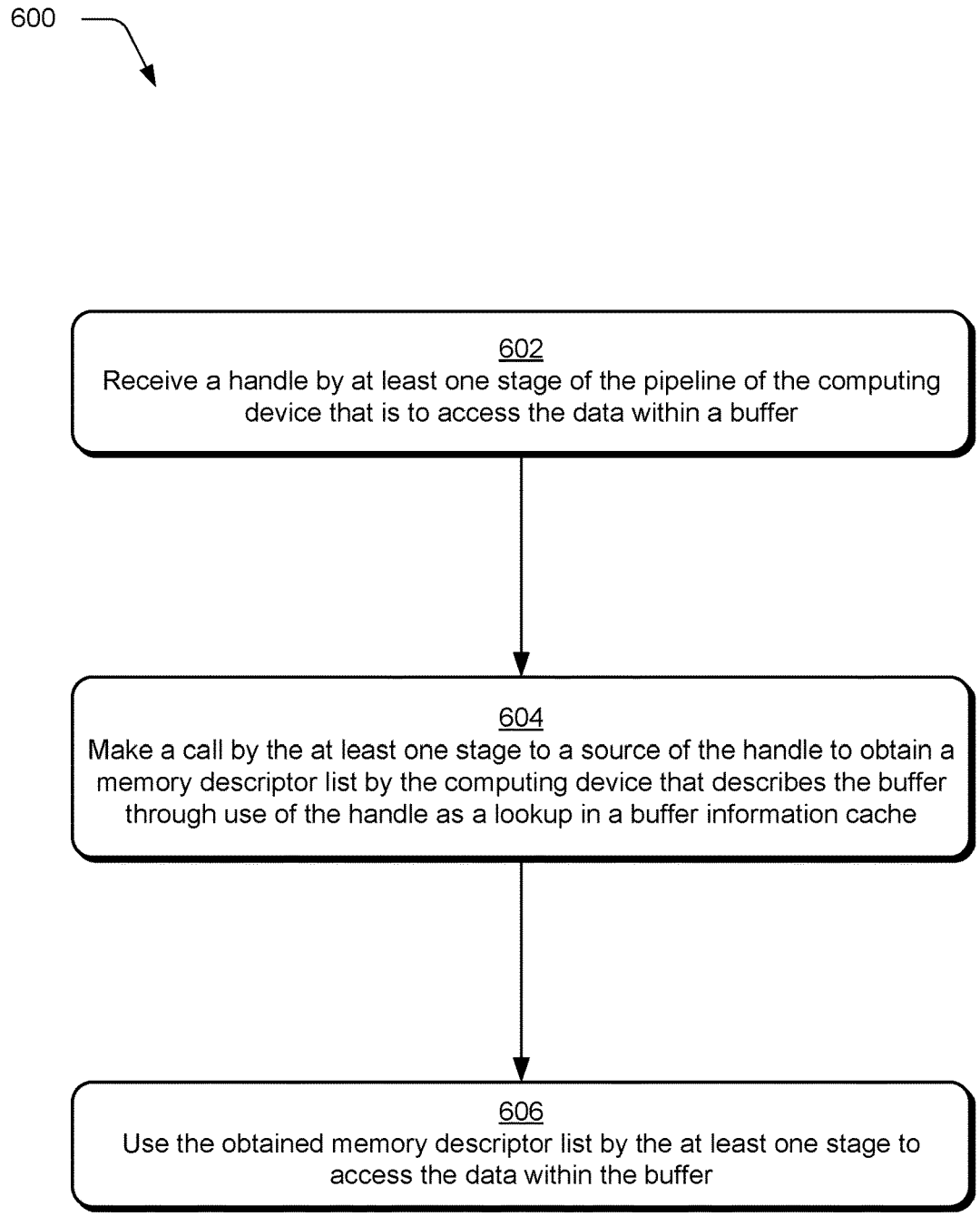
FIG. 6 is a flow diagram depicting a procedure in an example implementation in which a buffer is created and handles are used to obtain access to buffers through use of cached memory descriptor lists.

FIG. 6 depicts a procedure 600 in an example implementation in which a buffer is created and handles are used to obtain access to buffers through use of cached memory descriptor lists. In this example, a method is described to increase efficiency of access to data within a buffer by a pipeline of a computing device. A handle is received by at least one stage of the pipeline of the computing device that is to access the data within a buffer (block 602). Stage 218, for instance, receives handle 210.

A call is made by the at least one stage to a source of the handle to obtain a memory descriptor list by the computing device that describes the buffer through use of the handle as a lookup in a buffer information cache (block 604). The stage 218, for instance, calls the buffer allocator module 116 using the handle to obtain a corresponding memory descriptor list 208.

The obtained memory descriptor list is used by the at least one stage to access the data within the buffer (block 606). The stage 218, for instance, uses the memory descriptor list 208 to gain access to the buffer 120 and after completion releases the buffer 120 for use by subsequent stages 220, the sink 222, and so forth.

Example System and Device

FIG. 7 illustrates an example system generally at 700 that includes an example computing device 702 that is representative of one or more computing systems and/or devices that may implement the various techniques described herein as illustrated through inclusion of the buffer allocation module 116. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

CONCLUSION AND EXAMPLE IMPLEMENTATIONS

Example implementations described herein include, but are not limited to, one or any combinations of one or more of the following examples:

In one or more examples, a method is configured to increase efficiency of buffer usage within a pipeline of a computing device. The method includes creation of a buffer in memory of the computing device by performing a probe, lock, and map operation and caching of a memory descriptor list by the computing device that describes the buffer in a buffer information cache and has associated therewith a handle that acts as a lookup to the memory descriptor list. The method also includes passing the handle through the pipeline of the computing device for processing of data within the buffer by one or more stages of the pipeline such that access to the data is obtained by the one or more stages by using the handle as the lookup as part of a call to obtain the memory descriptor list for the buffer from the buffer information cache.

An example as described alone or in combination with any other recited example herein, wherein the memory descriptor list is cached in the buffer information cache of a device driver that is configured for execution in a kernel mode of an operating system of the computing device.

An example as described alone or in combination with any other recited example herein, wherein the handle supports the lookup to memory description list in the kernel mode from a user mode of the operating system.

An example as described alone or in combination with any other recited example herein, wherein the device driver corresponds to a camera and the data in the buffer is an image.

An example as described alone or in combination with any other recited example herein, wherein the buffer is part of a circular allocator.

An example as described alone or in combination with any other recited example herein, wherein the circular allocator is executed within a user mode of the operating system of the computing device.

An example as described alone or in combination with any other recited example herein, further comprising passing the handle from the pipeline to a sink of the computing device such that access to the data is obtained by the one or more stages by using the handle as the index as part of a call to obtain the memory descriptor list for the buffer from the browser information cache without repeating the probe, lock, and map operation.

An example as described alone or in combination with any other recited example herein, further comprising rendering, communicating, or storing the data within the buffer by the sink.

An example as described alone or in combination with any other recited example herein, further comprising detecting that an amount of available space in the memory has dropped below a threshold and in response reverting to use of the probe, lock, and map operations and ceasing use of the buffer information cache.

An example as described alone or in combination with any other recited example herein, wherein the access to the data is obtained by the one or more stages by using the handle as the lookup as part of a call to obtain the memory descriptor list for the buffer from the buffer information cache without repeating the probe, lock, and map operation.

In one or more examples, a method is described to increase efficiency of access to data within a buffer by a pipeline of a computing device. The method includes receiving a handle by at least one stage of the pipeline of the computing device that is to access the data within a buffer, making a call by the at least one stage to a source of the handle to obtain a memory descriptor list by the computing device that describes the buffer through use of the handle as a lookup in a buffer information cache, and using the obtained memory descriptor list by the at least one stage to access the data within the buffer.

An example as described alone or in combination with any other recited example herein, wherein the buffer is created through a probe, lock, and map operation and the using of the memory description list by the at least one stage to access the data within the buffer is performed without using the probe, lock, and map operation.

An example as described alone or in combination with any other recited example herein, wherein the memory descriptor list is cached in the buffer information cache of a device driver that is configured for execution in a kernel mode of an operating system of the computing device.

An example as described alone or in combination with any other recited example herein, wherein the handle supports the lookup to memory description list in the kernel mode from a user mode of the operating system.

An example as described alone or in combination with any other recited example herein, wherein the buffer is part of a circular allocator.

In one or more examples, a computing device is configured to increase efficiency of buffer usage within a pipeline of the computing device. The computing device includes a processing system configured to perform one or more operations and memory configured to maintain instructions that are executable by the processing system to implement an operating system. The operating system is configured to create a buffer in the memory by performing a probe, lock, and map operation; cache a memory descriptor list that describes the buffer in a buffer information cache and has associated therewith a handle that supports a lookup to the memory descriptor list; receive the handle by at least one stage of the pipeline that is to access the data within a buffer; make a call by the at least one stage to a source of the handle to obtain the memory descriptor list; and use the memory descriptor list by the at least one stage to access the data within the buffer.

An example as described alone or in combination with any other recited example herein, wherein the buffer is created through a probe, lock, and map operation and the use of the memory description list by the at least one stage to access the data within the buffer is performed without using the probe, lock, and map operation.

An example as described alone or in combination with any other recited example herein, wherein the memory descriptor list is cached in the buffer information cache of a device driver that is configured for execution in a kernel mode of an operating system of the computing device.

An example as described alone or in combination with any other recited example herein, wherein the handle supports the lookup to memory description list in the kernel mode from a user mode of the operating system.

An example as described alone or in combination with any other recited example herein, wherein the buffer is part of a circular allocator.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A method configured to increase efficiency of buffer usage within a pipeline of a computing device, the method comprising:
creating a buffer in memory of the computing device;
caching a memory descriptor list by the computing device that describes the buffer in a buffer information cache and has associated therewith a handle that acts as a lookup to the memory descriptor list; and
passing the handle through the pipeline of the computing device for processing of data within the buffer by one or more stages of the pipeline such that access to the data is obtained by the one or more stages by using the handle as the lookup as part of a call to obtain the memory descriptor list for the buffer from the buffer information cache.

2. A method as described in claim 1, wherein the memory descriptor list is cached in the buffer information cache of a device driver that is configured for execution in a kernel mode of an operating system of the computing device.

3. A method as described in claim 1, wherein the handle supports the lookup to memory description list in the kernel mode from a user mode of the operating system.

4. A method as described in claim 1, wherein the device driver corresponds to a camera and the data in the buffer is an image.

5. A method as described in claim 1, wherein the buffer is part of a circular allocator.

6. A method as described in claim 5, wherein the circular allocator is executed within a user mode of the operating system of the computing device.

7. A method as described in claim 1, further comprising passing the handle from the pipeline to a sink of the computing device such that access to the data is obtained by using the handle as part of a lookup to obtain the memory descriptor list for the buffer from the browser information cache.

8. A method as described in claim 7, further comprising rendering, communicating, or storing the data within the buffer by the sink.

9. A method as described in claim 1, further comprising detecting that an amount of available space in the memory has dropped below a threshold and in response reverting to use of the probe, lock, and map operations and ceasing use of the buffer information cache.

10. A method as described in claim 1, wherein the creating is performed using a probe, lock, and map operation and access to the data is obtained by the one or more stages by using the handle as the lookup as part of a call to obtain the memory descriptor list for the buffer from the buffer information cache without repeating the probe, lock, and map operation.

11. A method configured to increase efficiency of access to data within a buffer by a pipeline of a computing device, the method comprising:
  receiving a handle by at least one stage of the pipeline of the computing device that is to access the data within a buffer;
  making a call by the at least one stage to a source of the handle to obtain a memory descriptor list by the computing device that describes the buffer through use of the handle as a lookup in a buffer information cache; and
  using the obtained memory descriptor list by the at least one stage to access the data within the buffer.

12. A method as described in relation to claim 11, wherein the buffer is created through a probe, lock, and map operation and the using of the memory description list by the at least one stage to access the data within the buffer is performed without using the probe, lock, and map operation.

13. A method as described in claim 11, wherein the memory descriptor list is cached in the buffer information cache of a device driver that is configured for execution in a kernel mode of an operating system of the computing device.

14. A method as described in claim 13, wherein the handle supports the lookup to memory description list in the kernel mode from a user mode of the operating system.

15. A method as described in claim 11, wherein the buffer is part of a circular allocator.

16. A computing device configured to increase efficiency of buffer usage within a pipeline of the computing device, the computing device comprising:
  a processing system configured to perform one or more operations; and
  memory configured to maintain instructions that are executable by the processing system to implement an operating system, the operating system configured to:
    create a buffer in the memory by performing a probe, lock, and map operation;
    cache a memory descriptor list that describes the buffer in a buffer information cache and has associated therewith a handle that supports a lookup to the memory descriptor list;
    receive the handle by at least one stage of the pipeline that is to access the data within a buffer;
    make a call by the at least one stage to a source of the handle to obtain the memory descriptor list; and
    use the memory descriptor list by the at least one stage to access the data within the buffer.

17. A computing device as described in relation to claim 16, wherein the buffer is created through a probe, lock, and map operation and the use of the memory description list by the at least one stage to access the data within the buffer is performed without using the probe, lock, and map operation.

18. A computing device as described in relation to claim 16, wherein the memory descriptor list is cached in the buffer information cache of a device driver that is configured for execution in a kernel mode of an operating system of the computing device.

19. A computing device as described in relation to claim 18, wherein the handle supports the lookup to memory description list in the kernel mode from a user mode of the operating system.

20. A computing device as described in relation to claim 16, wherein the buffer is part of a circular allocator.

* * * * *